(12) United States Patent
Olson (10) Patent No.: US 7,004,111 B2
(45) Date of Patent: Feb. 28, 2006

(54) TREAT DISPENSER

(76) Inventor: Keryl Olson, 43 Shedd Hill Rd., Stoddard, NH (US) 03464

( * ) Notice: Subject to any disclaimer, the term of this patent is extended or adjusted under 35 U.S.C. 154(b) by 0 days.

(21) Appl. No.: 10/854,462

(22) Filed: May 26, 2004

(65) Prior Publication Data

US 2005/0263098 A1 Dec. 1, 2005

(51) Int. Cl.
*A01K 37/00* (2006.01)
*A45F 3/14* (2006.01)
*A45F 5/00* (2006.01)

(52) U.S. Cl. .................. 119/712; 119/51.01; 221/185; 221/279; 221/306; 221/175; 221/608; 221/282; 222/78; 222/386; 224/219; 224/221; 224/222; 224/196; 224/217; 224/218; 224/267; 220/830; 220/846; 2/160; 2/170

(58) Field of Classification Search ............... 221/185, 221/279, 306, 175, 608, 282; 119/712, 51.01; 224/219, 221, 222, 196, 217, 218, 267, 918; 220/830, 846; 222/386, 78; D3/215; 2/160, 2/170

See application file for complete search history.

(56) References Cited

U.S. PATENT DOCUMENTS

| | | | | |
|---|---|---|---|---|
| 1,670,720 A | * | 5/1928 | Gross .......................... 24/499 |
| 2,347,823 A | * | 5/1944 | Goodman et al. ............. 312/50 |
| 3,273,766 A | * | 9/1966 | Cosentino .................... 224/197 |
| 3,565,284 A | * | 2/1971 | Hinterreiter ................. 221/229 |
| 4,463,879 A | * | 8/1984 | Des Voignes ............... 222/175 |
| 4,504,980 A | * | 3/1985 | Butcher ........................... 2/160 |
| 4,966,305 A | * | 10/1990 | Hinterreiter ................. 221/229 |
| 5,072,856 A | * | 12/1991 | Kimble ........................ 222/78 |
| 5,088,121 A | * | 2/1992 | Wallace ......................... 2/160 |
| 5,302,302 A | * | 4/1994 | Shelley et al. ........... 224/148.4 |
| D357,801 S | * | 5/1995 | Short .......................... D3/215 |
| 5,433,359 A | * | 7/1995 | Flowers ...................... 224/222 |
| 5,460,295 A | * | 10/1995 | Law ........................... 221/185 |
| 5,484,085 A | * | 1/1996 | Bennett ...................... 222/175 |

(Continued)

FOREIGN PATENT DOCUMENTS

GB  2307231  * 6/1997

OTHER PUBLICATIONS

Spider Man Web Blaster {retrieved from internet Jun. 17, 2005] www.zooscape.com/cgi-bin/maitred/YellowLoop/questp406556 Aug. 11, 2003, 4 pages.*

Primary Examiner—Peter M. Poon
Assistant Examiner—Andrea M. Valenti
(74) Attorney, Agent, or Firm—Davis & Bujold, P.L.L.C.

(57) ABSTRACT

An animal reward dispensing apparatus for attaching to an animal trainer's forearm, the apparatus having a dispensing tube defined about a longitudinal axis, the dispensing tube having at least a first and second attaching straps for attaching the dispensing tube to the animal trainer's forearm. The dispensing tube also having a first and second spaced apart ends defining an interior cavity, and a spring located inside the interior cavity of the dispensing tube and positioned between the first and second ends of the dispensing tube. A variably sized animal rewards receptacle is defined in the interior cavity of the dispensing tube between a free end of the spring and the second end of the dispensing tube, and a finger operated dispensing mechanism is located adjacent the second end of the dispensing tube having a closed position to contain an amount of animal rewards within the variable animal reward receptacle, and an open position to facilitate the extraction and dispensing of at least one animal reward from the dispensing tube and into the trainer's hand.

9 Claims, 4 Drawing Sheets

U.S. PATENT DOCUMENTS

| | | | | |
|---|---|---|---|---|
| D374,767 S | * | 10/1996 | Leach | D3/218 |
| 5,607,090 A | * | 3/1997 | Brown | 224/217 |
| 5,678,730 A | * | 10/1997 | Fabek et al. | 222/78 |
| 5,839,607 A | * | 11/1998 | Swanson | 221/231 |
| 5,961,003 A | * | 10/1999 | Coryell | 222/175 |
| 6,168,556 B1 | * | 1/2001 | Saavedra | 482/93 |
| 6,330,961 B1 | * | 12/2001 | Borja | 224/222 |
| 2003/0057228 A1 | | 3/2003 | Brown et al. | |
| 2003/0057240 A1 | * | 3/2003 | Johnson | 224/219 |
| 2003/0132239 A1 | * | 7/2003 | Konig | 221/228 |
| 2003/0136345 A1 | | 7/2003 | O'Rourke | |

* cited by examiner

TREAT DISPENSER

FIELD OF THE INVENTION

The present invention relates to a device suitable for holding rewards or treats generally used in the art of training animals as a consequence for the appropriate performance of specific acts and to reinforce specific behaviors; and particularly for use in training animals utilizing a pre-regulated amount of reward of a desired size and shape in an immediate and non-distracting manner.

BACKGROUND OF THE INVENTION

When training animals, it is beneficial for trainers to reinforce specific behaviors and acts performed by the animal by offering positive reinforcement. It is necessary to provide such reward in an immediate and non-distracting manner to maximize training because an animal's ability to associate reward with specific acts is limited to a very short period of time (approximately three (3) seconds). This ability quickly deteriorates with the passage of time and can be adversely affected by distracting movements or sounds produced by the trainer obtaining and delivering the reward.

Several known methods of providing positive reinforcement are currently employed by trainers. For example, the reward can be carried in one's hand, one's mouth (as done in many dog shows), one's pocket, a plastic or paper bag or a bait bag. Each of these methods, however, adversely affects the act/reward association time that is so crucial to effective training. Carrying rewards in the trainer's hand is distracting for the trainer and the animal in that the reward soils the trainer's hand, limits the trainer's ability to manually manipulate the animal's leash, body position or fully perform nonverbal gestures which results in fewer hand signals due to the hand's reduced mobility. Additionally, the animal's attention is directed at the hand holding the reward. Carrying rewards in one's mouth is also distracting of the trainer and the animal in that the trainer's mouth is soiled, verbal cues are hindered as the reward interferes with the trainer's ability to speak commands and because the reward is distracting as it is in full view of the animal.

Carrying rewards in one's pocket, a bag or a bait bag also hinders the training process in that rewarding an animal with reward may require the trainer to dig into his pocket, unzip or open the containment device causing harmful delay in the act/reward associate time and/or causing the animal to associate his reward with a noise such as a zipper opening, or Velcro® being pulled away or the resulting of a plastic or paper bag. Additionally, training an animal utilizing the disposable pocket requires the trainer to consciously count the quantity of rewards retrieved from the pocket and return any unwanted rewards before rewarding the animal; thereby increasing the act/reward association time. The disposable pocket may also be prone to falling off during prolonged training as the adhesive may lose its grip, or be prone to being knocked off by an exuberant animal, or inclement training conditions such as brush, high grass during field exercises. Likewise, devices such as bait bag with clip may also be prone to falling off the trainer when the trainer bends down and also in many of the same instances where the disposable pocket is likely to fall off. Common storage or disposal alternative include: (1) returning the excess rewards to the dispenser, (2) over-rewarding the animal or (3) storing the excess in hand or otherwise on the trainer's person.

Training animals requires skill, knowledge and a certain degree of patience. Maximizing training efforts also requires the right incentive and the right method of delivery. The above-mentioned methods of providing rewards are all utilized in an attempt to maximize training efforts. These methods, however, for the reasons previously stated, all produce distinguishable hindrances to maximized training. Therefore, the object of this invention is to provide a means of training animals utilizing rewards and to solve the above noted problems.

OBJECT AND SUMMARY OF THE INVENTION

Wherefore, it is an object of the present invention to overcome the above mentioned shortcomings and drawbacks associated with the prior art.

Another object of the present invention is to provide a non-distracting device worn on the trainer's person and under their garments to carry a desired amount of animal rewards.

A further object of the present invention is to provide the device with a dispensing mechanism which can be easily operated by a single hand of the trainer to dispense at least one reward at any desired time.

Yet another object of the present invention is to provide an attachment so that the device can be directly attached to the trainer's arm and essentially hidden underneath a shirt sleeve of the trainer.

A still further object of the present invention is to provide the dispensing mechanism immediately adjacent or in the trainer's palm so that the trainer can manipulate the mechanism with one finger and the reward will drop into the trainer's palm of the same hand when desired.

The present invention also relates to an animal reward dispensing apparatus for attaching to an animal trainer's forearm comprising a dispensing tube defined about a longitudinal axis, the dispensing tube having at least a first and second attaching straps for attaching the dispensing tube to the animal trainer's forearm; a first and second spaced apart ends of the dispensing tube defining an interior cavity therebetween; a spring located inside the interior cavity of the dispensing tube and positioned between the first and second ends of the dispensing tube; a variable animal reward receptacle is defined in the interior cavity of the dispensing tube between a free end of the spring and the second end of the dispensing tube; and a finger operated dispensing mechanism located adjacent the second end of the dispensing tube having a closed position to contain an amount of animal rewards within the variable animal reward receptacle, and an open position to facilitate the extraction and dispensing of at least one animal reward from the dispensing tube and into the trainer's hand.

The present invention also relates to an animal reward dispensing apparatus for attaching to an animal trainer's forearm comprising a dispensing tube defined about a longitudinal axis, the dispensing tube having at least a first and second attaching straps for attaching the dispensing tube to the animal trainer's forearm; a first closed end spaced along the longitudinal axis from a second end having an opening spaced apart ends of the dispensing tube defining an interior cavity therebetween; an animal reward receptacle is defined in the interior cavity of the dispensing tube between the first and the second end of the dispensing tube; and a finger operated dispensing mechanism located adjacent the second end of the dispensing tube having a closed position to contain an amount of animal rewards within the variable animal reward receptacle, and an open position to facilitate the extraction and dispensing of at least one animal reward from the dispensing tube and into the trainer's hand.

The object of the present invention is to provide a device for training animals containing reward within the device to dispense when desired to the animal.

A still further object of the invention is accomplished by providing a conveniently sized, reusable dispensing container capable of being securely attached to the trainer's arm, and capable of receiving and housing multiple rewards, and being capable of dispensing a single reward upon demand.

The advantages of such a device are numerous and solve many of the problems associated with the prior art. For example, with the dispenser attached to a trainer's arm, this thereby frees up the trainer's hands so that the trainer is not soiled by constant contact with the reward and the trainer's ability to manually manipulate the animal's position or fully perform nonverbal gestures are not reduced. Additionally, the animal's attention is not diverted by the hand holding the reward; thereby reducing visual and olfactory distractions. Furthermore, the dispenser also solves the problems associated with carrying the reward in one's mouth as the trainer's mouth is not soiled, verbal cues are not hindered and the reward is not in full view of the animal.

BRIEF DESCRIPTION OF THE DRAWINGS

The invention will now be described, by way of example, with reference to the accompanying drawings in which.

DETAILED DESCRIPTION OF THE INVENTION

Figure 1:
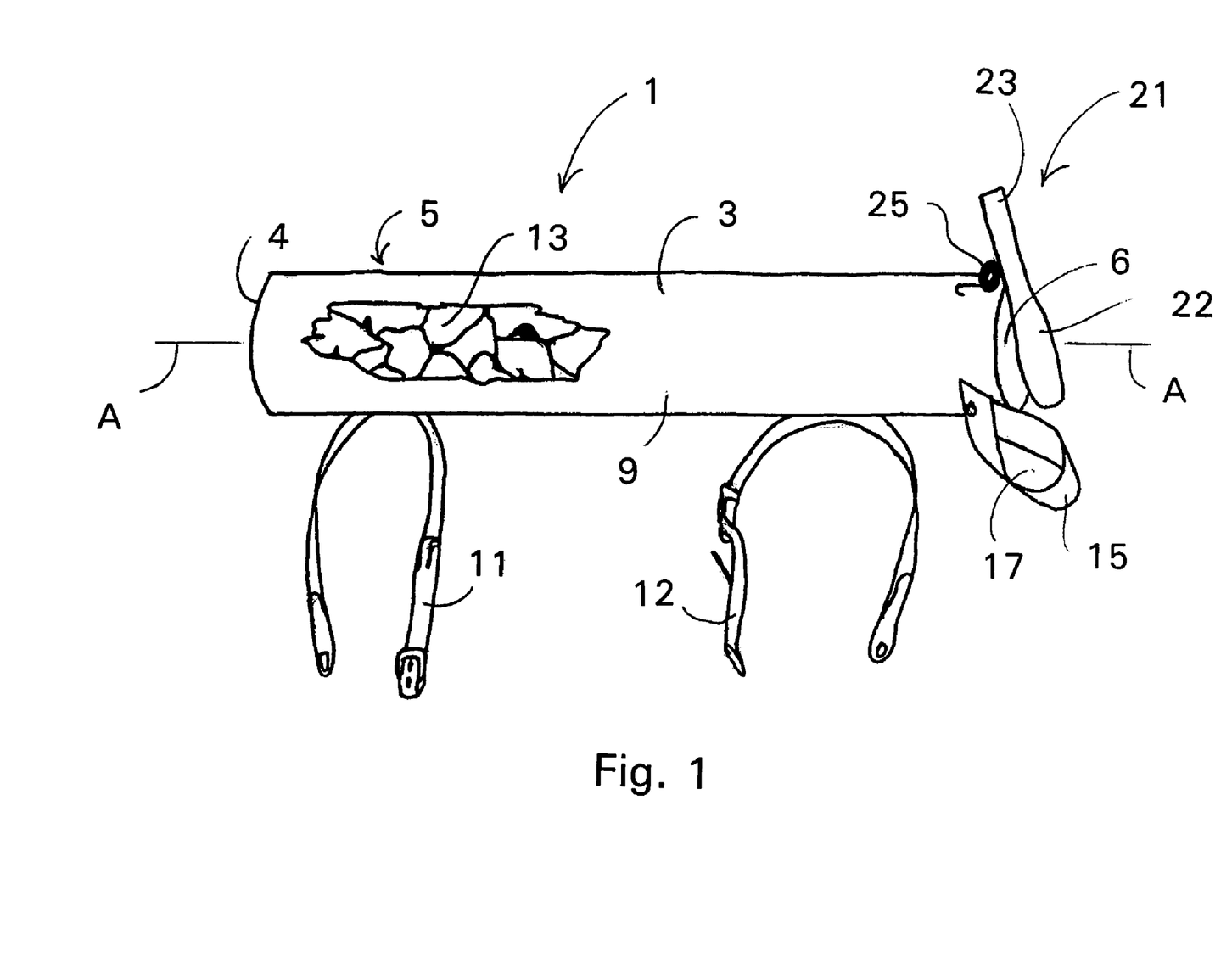
FIG. 1 is a perspective side view of the reward dispensing device of a first embodiment.

Turning now to FIG. 1, a brief description concerning the various components of the present invention will now be briefly discussed. As can be seen in this embodiment the animal training reward dispenser 1 of the present invention is composed of a plastic, metal or fiberglass tubular dispensing canister 3 having a first closed end 4 and a second open, or dispensing end 6 for dispensing the rewards into the trainer's hand. The dispensing canister 3 is generally an elongate cylinder having a circular cross section, but may be also be almost any other shape in order to conform to certain sizes and shapes of specific animal treats, e.g., square, triangular, etc., or the canister 3 may be configured to ergonomically conform to the trainer's arm.

The dispensing canister 3 is generally defined about a longitudinal axis A extending the length of the canister 3 and has an interior cavity 5 defined between the closed end and the dispensing end 6. The interior cavity 5 is intended to hold a plurality of animal rewards or treats 13 to be dispensed from the canister 3. In an embodiment of the present invention, a spring may be provided within the interior cavity 5 between the closed end of the canister 3 and the rewards to urge the animal rewards 13 towards the dispensing end of the canister 3. However, it is also appreciated that in view of the general use and location of the dispensing canister 3 where it is attached to a trainer's forearm, gravity may also be used to provide the rewards to the appropriate dispensing end 6 of the canister 3.

An outer surface 9 of the dispensing canister 3 is provided with at least a first and a second fastening straps 11, 12 for securing the dispensing canister 3 to the trainer's arm. The straps are affixed to the canister 3 substantially perpendicular relative to the longitudinal axis of the canister 3 and may be made of any generally known material, e.g., elastic, cloth, nylon, plastic etc. The straps 11, 12 are provided with adjustable buckles, or hook and loop fasteners for securing the straps about the trainer's arm. The first fastening strap 11 is generally affixed to the dispensing canister 3 adjacent or nearer to the closed end 4 of the dispensing canister 3 and the second fastening strap 12 is generally located closer to the second dispensing end 6 of the dispensing canister 3 so that the dispensing canister 3 may be secured generally on the inside portion of the trainer's forearm with the straps extending around and securing the canister 3 to the trainer's inside forearm. As is readily discernable to a person of ordinary skill in the art, the trainer's sleeve may then be extended over the dispensing canister 3 so that the device 1 is substantially out of sight, and therefore less distracting for the animal being trained.

A third strap 15 may be also be provided and is generally affixed to the canister 3 adjacent the dispensing end. The third strap 15 extends from a connection point with the outer surface 9 of the canister 3 to a looped end, or the end of the third strap having a hole 17 therethrough, through which a trainer's thumb or finger may be inserted to hold the dispensing end 6 of the canister 3 immediately adjacent, or in the palm of the trainer's hand. This orientation of the dispensing end 6 of the canister 3 facilitates the dispensing of the reward 13 into the trainer's hand for giving the reward or treat 13 to the animal once they have completed a desired act or behavior.

In one embodiment of the present invention, the dispensing end is provided with a finger operated reward dispensing mechanism 21 for permitting a reward 13 retained in the canister 3 to be dispensed from the open dispensing end 6 of the canister 3 into the same hand of the trainer that is operating the dispensing mechanism. The dispensing mechanism is provided with a cover or top 22 having a finger operable lever 23 attached thereto. The cover 22 and lever 23 are rotatably connected to the canister 3 adjacent to the dispensing end 6 of the canister 3 by a second spring 25 which biases the top 22 to cover the dispensing end 6 of the canister 3 thus retaining the rewards 13 within the interior cavity 5. The opposing closed end 4 of the canister 3 may be either made from a screw-type fitting, a plug or other such item as known in the art, to removably close the first closed end 4, or the first end may be permanently closed, for instance, where the dispensing canister 3 is molded or extruded from a single piece of plastic.

In the present invention, the dispensing mechanism lever 23 may be operated by any of the trainer's fingers or thumb on the same hand and arm to which the canister 3 is attached. Such manipulation opens the dispensing end 6 of the canister 3 and dispenses at least a single rewards 13 into the trainer's same hand which can then be given to an animal without having to use two hands or make distracting movements retrieving a reward 13 which tends to inhibit the proper timing and effectiveness of such reward 13. With the trainer's arm having the attached dispensing canister 3 hanging naturally downward, the rewards 13 inside the canister 3 can be dispensed solely under the influence of gravity maintaining the rewards in a position located substantially adjacent or towards the dispensing end 6 so that when the dispensing mechanism is operated a reward 13 is immediately dispensed into the trainer's palm.

Figure 2:
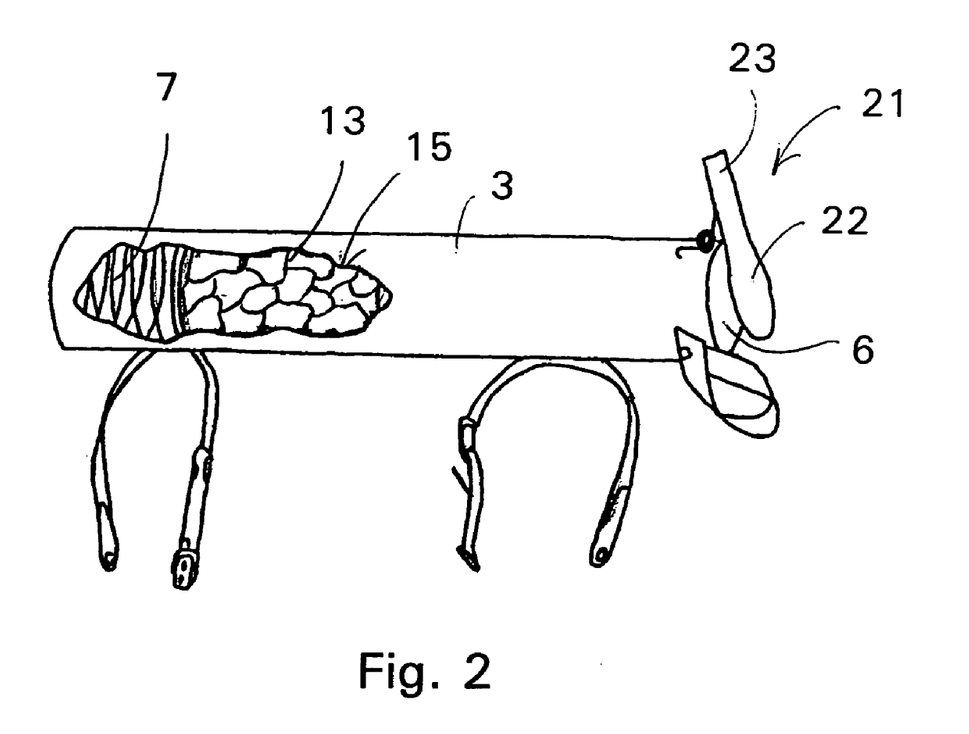
FIG. 2 is a perspective side view of the reward dispensing device of a second embodiment.

In another embodiment of the present invention as seen in FIG. 2, an interior cavity spring 7 may be provided within the canister 3 which biases the animal rewards 13 retained in the dispensing canister 3 towards the open dispensing end 6 of the canister 3. In this embodiment, the dispensing canister 3 comprises the interior spring 7 which defines a variably sized animal rewards receptacle 15, which is essentially based on the amount of compression of the interior spring 7 relative to the amount of rewards or treats 13 in the canister 3. Thus, as the trainer dispenses rewards 13 by activating the lever and opening the cover or top 22 of the reward dispensing mechanism, the interior cavity spring 7 which extends between the rewards and the closed end 4 of the container maintains the rewards in a biased state towards the dispensing end 6 and correspondingly decreasing the size of the animal reward receptacle 15 as the rewards are dispensed. The spring and variable sized rewards receptacle also decreases the noise made by the rewards as the spring keeps the rewards from rattling around in the canister 3 thus lessening any distractions for the animal being handled. A spring platform having an outer diameter corresponding essentially to the interior diameter of the canister 3 may be positioned or connected at the end of the spring adjacent, or closest to the rewards, i.e. the platform is sandwiched between the spring end and the rewards to present a complete surface for pushing the rewards according to the spring bias and correspondingly, the spring according to the amount of rewards put into the container.

When the dispensing canister 3 is empty, the interior spring 7 extends at least to about the open dispensing end 6 of the canister 3 and can be recharged with fresh rewards 13. As new rewards or treats 13 are inserted into the interior cavity 5, the interior spring 7 is compressed and the animal rewards receptacle will correspondingly expand until either a desired number of rewards 13 are inserted, or the spring is fully compressed and the canister 3 is full. The second spring 25 biasing the top 22 into closing the dispensing end is of sufficient strength to maintain the interior spring 7 in compression within the interior cavity 5 until the top 22 is actuated by the trainer to dispense a reward 13. As the lever 23 rotates the top 22 away from the dispensing end 6, the second spring 25 urges the rewards towards the open end and dispenses at least one reward into the trainer's hand. Thus, this embodiment is capable of dispensing rewards no matter what position the trainer's arm or hand is in. Even where the arm is raised over the trainer's head the second spring 25 ensures that a reward can be delivered to the trainer to further eliminate distracting movements.

Figure 3:
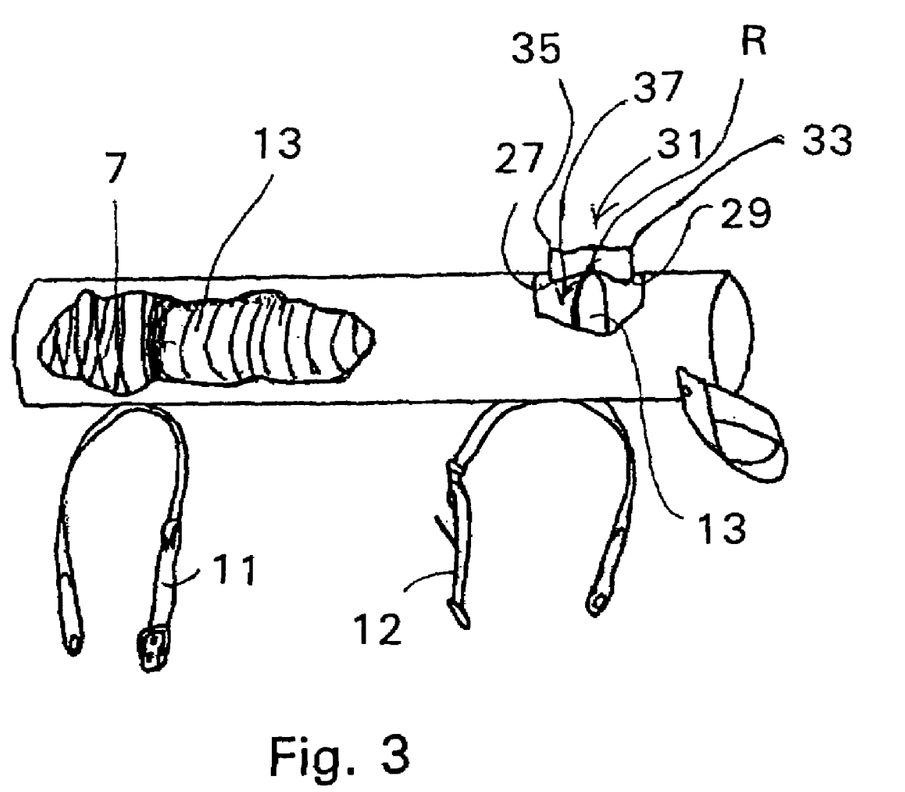
FIG. 3 is a side view of an alternative finger operated reward dispensing mechanism.

In a further embodiment of the present invention, as shown in FIG. 3, the dispensing end 6 of the canister 3 is provided with a single finger operated gate lever 31 which is also spring actuated. The single finger gate lever 31 extends through an opening provided in the side of the dispensing canister 3 adjacent the open end and provides two spaced apart prongs 27, 29 extending into the interior cavity 5 and which rotate about a point of rotation R. The single gate lever 31, when actuated, permits at least a single treat 13 to be dispensed into the trainer's same hand as that with the operating finger. When the gate lever 31 is depressed at a first end 33 the prongs 27, 29 are caused to rotate about the point of rotation R and a reward 13 is then biased by the interior spring 7 or gravity into an intermediate space 37 between the first and second end of the prongs. As the first end 35 of the gate lever 31 is released, the prongs 27, 29 rotate with the reward 13 remaining in the intermediate space 37, into and through a neutral position, and as a second end 35 of the gate lever 31 is pushed by the trainer's finger, the prongs 27, 29 rotate in an opposite direction passing the reward 13 out of the interior cavity 5 and into the trainer's hand.

Figure 4A:
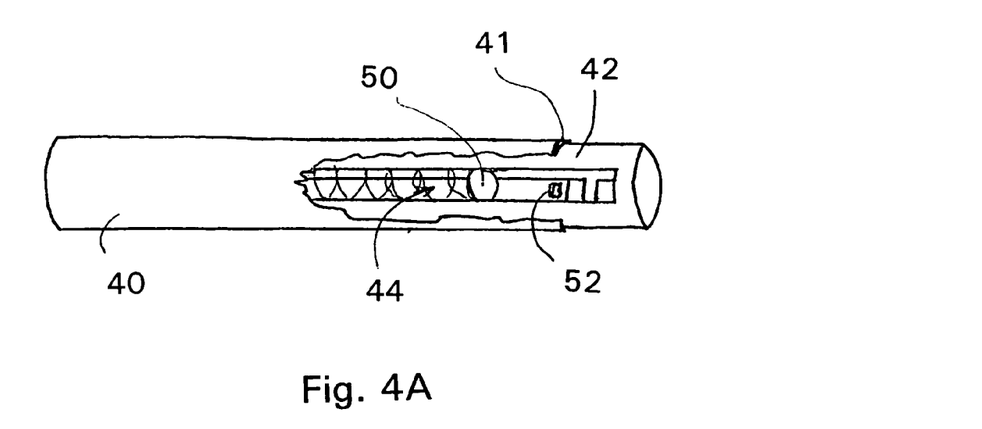
FIG. 4A is a still further embodiment of the reward dispensing device having a nested cylinder configuration.
Figure 4B:
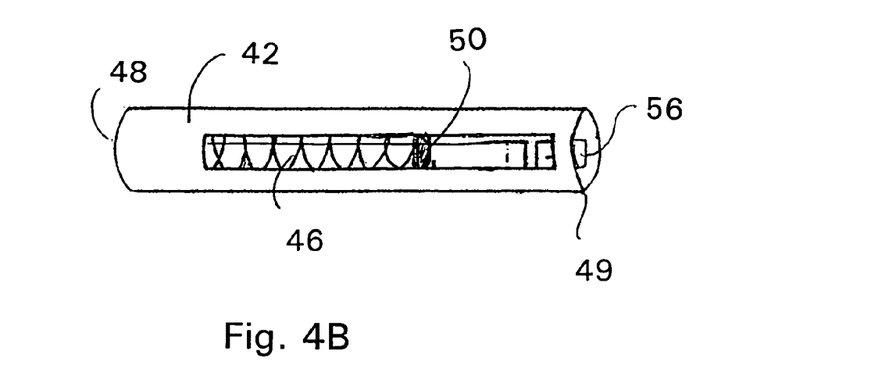
FIG. 4B is a side perspective view of the inner cylinder.
Figure 4C:
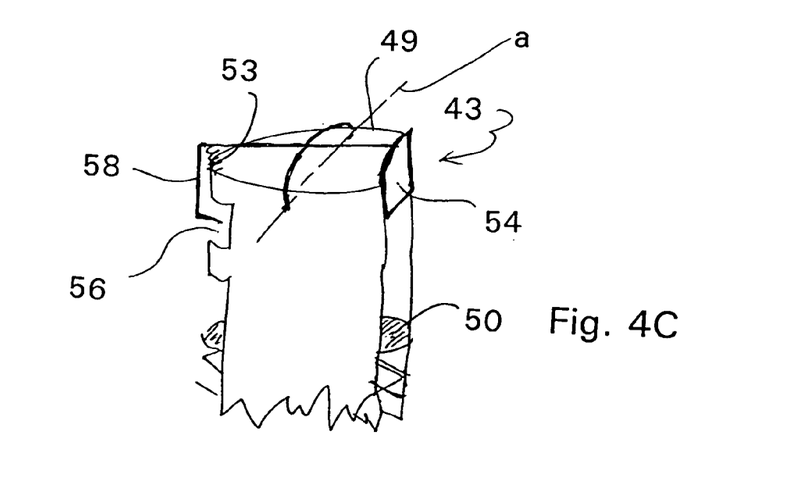
FIG. 4C is a perspective view of a finger operated reward dispensing mechanism used in conjunction with the nested cylinders.

In yet another embodiment of the present invention as shown in FIGS. 4A–C, the canister 40 is provided with a slidable interior reward holder 42 having a pair of lengthwise openings 44 along opposing sides to accommodate the introduction of rewards 13 into the reward holder 42. The reward holder 42 is approximately the same length of the canister 40 and is sized slightly smaller than the interior diameter of the canister 40 to be able to slidably fit inside the canister 40. A spring 46 is provided in the reward holder 42, with one end of the spring 46 shown in FIG. 4B in contact with a bottom end 48 of the reward holder 42 and a second end of the spring supporting a contact plate 50 and biasing the contact plate 50 towards a top end 49 of the reward holder 42. As the rewards 13 are inserted into the reward holder 42 the contact plate 50 is pushed downwards towards the bottom end 48 of the reward holder 42 against the bias of the spring 46. When a desired number of rewards 13 are inserted into the holder 42, the contact plate 50 via the spring 46 snugly maintains pressure on the rewards 13 against the covered top end 49 of the rewards holder 42.

A stop 52 is provided on the interior wall of the canister 40 adjacent the open end 41 of the canister 40. With the holder spring 46 and contact plate 50 inside the canister 40 and no rewards in the holder 42, the stop 52 projects through at least one of the pair of openings 44 in the holder 42 and engages the contact plate 50 as the contact plate 50 is forced by the spring 46 towards the open end 41 of the canister 40. Thus, the contact plate 50 cannot pass beyond the open end 41 of the canister 40. However, upon the appropriate force being applied the reward holder 42 may slide outward from the open end 41 of the canister 40 relative to the contact plate 50 until the bottom of the holder 40 encounters the contact plate 50 held by the stop 52 adjacent the open end 41 of the canister 40. Thus, as is readily apparent, the biasing nature of the spring 46 in cooperation with the stop 52 and the contact plate 50 maintains the reward holder 42 in a neutral position biased towards the bottom end of the canister 40 but able to move away from the bottom end of the canister 40 where a force against the spring bias is provided.

In the neutral position described above, the top end 49 of the holder 42 extends just beyond the open end 41 of canister 40 to the extent that a reward 13 is also past the open end 41 of the canister 40 but still retained in the reward holder 42. A spring 53 biased gate 54 is provided on the holder 42 to cover the portion 43 of the holder opening 44 which is exposed beyond the canister 42 and thus retains the reward 13 no matter what position the canister 40 is in. On the opposing side of the reward holder 42 from the gate 54 is an opening 56 which is smaller than the reward 13, so it cannot fall out, but large enough to permit a lever 58, or even a finger of the operator can be inserted therethrough to push the reward through the gate 54 on the opposite side of the holder 42. The gate 54 and the lever 58 may be connected so that movement of the lever 58 to push the reward 13 rotates about a rotation axis a through the top of the holder 42 also opens the gate 54 to permit the reward to escape from the holder 42 into the trainer's hand or directly to the animal being trained.

Since certain changes may be made in the above described improved Reward dispensing mechanism, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A chewable reward dispensing apparatus for attaching to an animal trainer's forearm to aid in training an animal comprising:
   a dispensing tube defined about a longitudinal axis, the dispensing tube having at least an attaching strap for attaching the dispensing tube to the animal trainer's forearm
   a first and second spaced apart ends of the dispensing tube defining an interior cavity therebetween;
   a spring located inside the interior cavity of the dispensing tube and positioned between the first and second ends of the dispensing tube;
   a variable animal reward receptacle is defined in the interior cavity of the dispensing tube between a free end of the spring and the second end of the dispensing tube;
   a finger operated dispensing mechanism located adjacent the second end of the dispensing tube having a closed position to contain an amount of chewable animal rewards within the variable animal reward receptacle, and an open position to facilitate the extraction and dispensing of at least one chewable animal reward from the dispensing tube and into the trainer's hand;
   wherein the strap attaches the dispensing tube directly to the inside of the trainer's forearm with the longitudinal axis of the dispensing tube aligned substantially parallel to a longitudinal axis of the trainer's forearm so that the trainer's hands are free to provide signals so the animal being trained and the animal is not distracted by sight of the dispensing tube or the animal rewards in the trainer's hand; and another fastening strap attached to the second end of the dispensing tube, the fastening strap having a first end fastened directly to the dispensing tube and a second end having a hole formed therein to accommodate a finger or thumb of the trainer ensuring that the second end of the dispensing tube is positioned immediately adjacent the trainer's palm.

2. The chewable animal reward dispensing apparatus for attaching to an animal trainer's forearm as set forth in claim 1 wherein the finger operated dispensing mechanism comprises a top cover biased into the closed position over an opening in the second end of the dispensing tube by a second spring.

3. The chewable animal reward dispensing apparatus for attaching to an animal trainer's forearm as set forth in claim 2 further comprising a finger operated lever connected with the spring blasted top cover which is manipulated in a single motion by the trainer to move the finger operated dispensing mechanism from the closed position into the open position to dispense an animal reward.

4. The chewable animal reward dispensing apparatus for attaching to an animal trainer's forearm as set forth in claim 3 wherein after the single motion by the trainer to move the finger operated dispensing mechanism from the closed position into the open position to dispense an animal reward, the finger operated dispensing mechanism is returned automatically by the second spring to the closed position after dispensing at least one animal reward.

5. A chewable animal reward dispensing apparatus for attaching to an animal trainer's forearm comprising:
   a dispensing tube defined about a longitudinal axis, the dispensing tube having at least an attaching strap for attaching the dispensing tube to the animal trainer's forearm;
   a first closed end spaced along the longitudinal axis from a second end having an opening, spaced apart ends of the dispensing tube defining an interior cavity therebetween;
   an animal reward receptacle is defined in the interior cavity of the dispensing tube between the first and the second end of the dispensing tube;
   a finger operated dispensing mechanism located adjacent the second end of the dispensing tube having a closed position to contain an amount of animal rewards within the variable animal reward receptacle, and an open position to facilitate the extraction and dispensing of at least one chewable animal reward from the dispensing tube and into the trainer's hand; and
   wherein the attaching strap attaches the dispensing tube directly to the inside of the trainer's forearm with the longitudinal axis of the dispensing tube aligned substantially parallel to a longitudinal axis of the trainer's forearm so that the trainer's hands are free to provide signals to the animal being trained and the animal is not distracted by sight of the dispensing tube or the animal rewards in the trainer's hand; and another fastening strap attached to the second end of the dispensing tube, the fastening strap having a first end fastened directly to the dispensing tube and a second end having a hole formed therein to accommodate a finger or thumb of the trainer ensuring that the second end of the dispensing tube is positioned immediately adjacent the trainer's palm.

6. The chewable animal reward dispensing apparatus for attaching to an animal trainer's forearm as set forth in claim 5 wherein the finger operated dispensing mechanism comprises a top cover biased into the closed position over an opening in the second end of the dispensing tube by a spring.

7. The chewable animal reward dispensing apparatus for attaching to an animal trainer's forearm as set forth in claim 6 further comprising a finger operated lever connected with the spring biased top cover which is manipulated in a single motion by the trainer to move the finger operated dispensing mechanism from the closed position into the open position to dispense an animal reward.

8. The chewable animal reward dispensing apparatus for attaching to an animal trainer's forearm as set forth in claim 7 wherein after the single motion by the trainer to move the finger operated dispensing mechanism from the closed position into the open position to dispense an animal reward, the finger operated dispensing mechanism is returned automatically by the spring to the closed position after dispensing at least a chewable animal reward.

9. A method for rewarding an animal during training by providing a chewable reward dispensing apparatus for attaching to an animal trainer's forearm to aid in training the animal, the method comprising the steps of:
   forming a dispensing tube defined; about a longitudinal axis, the dispensing tube having at least an attaching strap for attaching the dispensing tube to the animal trainer's forearm;
   defining an interior cavity between a first closed end spaced along the longitudinal axis from a second end having an opening;

providing an animal reward receptacle defined in the interior cavity of the dispensing tube between the first and the second end of the dispensing tube to contain the chewable animal rewards;

containing the animal rewards via a finger operated dispensing mechanism located adjacent the second end of the dispensing tube having a closed position to contain an amount of animal rewards within the variable animal reward receptacle, and an open position to facilitate the extraction and dispensing of at least one chewable animal reward from the dispensing tube and into the trainer's hand;

attaching via the attaching strap the dispensing tube directly to the inside of the trainer's forearm with the longitudinal axis of the dispensing tube aligned substantially parallel to a longitudinal axis of the trainer's forearm so that the trainers hands are free to provide signals to the animal being trained and the animal is not distracted by sight of the dispensing tube or the animal rewards in the trainer's hand; and attaching another fastening strap to the second end of the dispensing tube, the fastening strap having a first end fastened directly to the dispensing tube and a second end having a hole formed therein to accommodate a finger or thumb of the trainer ensuring that the second end of the dispensing tube is positioned immediately adjacent the trainer's palm.

* * * * *